UNITED STATES PATENT OFFICE 2,033,487

ACYL DERIVATIVES OF THE DIHYDRO-FOLLICLE HORMONE AND METHOD OF MAKING THE SAME

Erwin Schwenk, New York, N. Y., and Friedrich Hildebrandt, Hohen Neuendorf, near Berlin, Germany, assignors to Schering-Kahlbaum A. G., Berlin, Germany No Drawing. Application December 22, 1933, Serial No. 703,602. In Germany December 23, 1932

19 Claims. (Cl. 260—103)

This invention relates to new derivatives of hydrogenation products of the follicle hormone and more particularly to acyl derivatives of dihydrofollicle hormone and a method of making the same.

One object of this invention is to provide new and useful compounds of very valuable therapeutical properties. For this purpose the dihydrofollicle hormone obtained by hydrogenation of the follicle hormone in such a manner that only the ketonic group is reduced to a secondary alcohol group while the benzene nucleus remains unattacked, is subjected to the action of an acylating agent. Thereby mono- or diacyl derivatives are formed according to the method used.

The follicle hormones of the present invention may be obtained by treating, for example, substances of the following type:

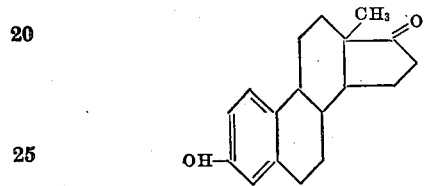

with suitable hydrogenation agents to form the dihydrofollicle hormone having the following structural formula:

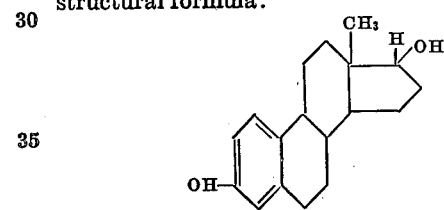

By subjecting the same to acylation agents, compounds of the following type are formed:

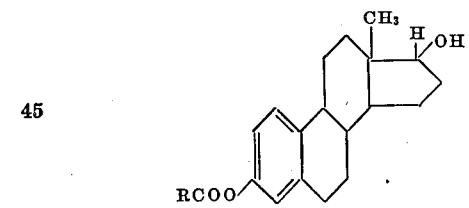

Under other conditions as described herein, acylation of both of the OH groups may take place, resulting in the formation of compounds of the following type:

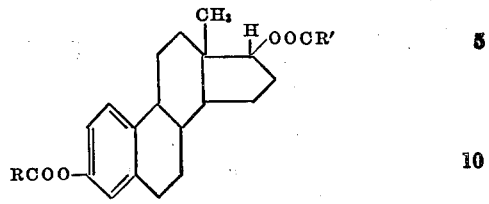

In the above formulas R and R' are the same or different alkyl or aryl groups.

For instance, by carrying out the reaction in a solvent wherein the primarily formed monoacyl derivatives is soluble only with difficulty, the acylation can be interrupted after the formation of the monoacyl derivative. Hence, monoacylated compounds are obtained wherein the phenolic hydroxyl group of the dihydrofollicle hormone molecule is acylated while the alcoholic hydroxyl group is still intact.

On carrying out the acylation in a solvent wherein the mono- as well as the diacylation products are kept in solution, both hydroxyl groups can be acylated.

Another way of obtaining said acyl derivatives of the dihydrofollicle hormone consists in first subjecting the acyl derivatives of the follicle hormone to the action of reducing agents or to a catalytic hydrogenation process. Thereby monoacyl derivatives of the dihydrofollicle hormone are obtained which can be transformed into the corresponding diacyl compounds by further acylation as described above.

It is also possible, in order to produce directly acylation products of the follicle hormone to subject the latter to a combined acylation and reducing process by carrying out the reduction in an acylating medium.

The term "follicle hormone" as used hereinafter in the specification and in the claims includes not only the follicle hormone of the formula $C_{18}H_{22}O_2$, but also other products of similar physiological properties, such as for instance the unsaturated follicle hormones, equilin $C_{18}H_{20}O_2$ and hippolin $C_{18}H_{18}O_2$ and the like, whereby these compounds may be obtained from natural sources, such as urine, organs and the like, or synthetically. These follicle hormones have in general the same structural formulas as those given above but differ in that they have additional double bonds in place of pairs of hydrogen atoms. They may be represented by the general formula $$C_{18}H_aO_2$$

wherein $a$ is 18, 20 or 22.

The term "dihydrofollicle hormone" as used hereinafter in the specification and in the claims includes not only the dihydrofollicle hormone of the formula $C_{18}H_{24}O_2$, but also other products of the same physiological properties which contain a secondary hydroxyl group in their molecule, as they are obtained by gentle hydrogenation of the above described follicle hormones, whereby the benzene nucleus of the hormone remains unaffected. They may be represented by the general formula $$C_{18}H_bO_2$$

wherein $b$ is 20, 22 or 24, and wherein the benzene nucleus is not hydrogenated. The dihydrofollicle hormones may be produced as described in the copending application of Hildebrandt and Schwenk, Serial No. 694,686, filed Oct. 21, 1933.

Said application describes a method wherein follicle hormones are subjected to the action of agents which are capable of reducing the keto group of the follicle hormones to the secondary alcohol group. This is accomplished by subjecting the starting materials to the action of catalytically activated hydrogen avoiding the presence of a substantial excess of hydrogen, and by either using highly diluted alcoholic solutions of the follicle hormones or by employing reduction catalysts of such low activity that the benzene ring is not attacked. There may also be used hydrogen in the atomic state or in statu nascendi, or hydrogen in such compounds as will give off hydrogen in the presence of hydrogenation catalysts; or other methods of supplying the necessary hydrogen may be employed.

The terms "acylation process" and "acylating agent" as used hereinafter in the specification and the claims include the known processes and agents for introducing an acyl group into the molecule of the dihydrofollicle hormone. The acylation may be carried out by using the acid anhydride or the acid chloride or the acid itself as acylating agents in the presence or absence of catalysts or in any other known manner.

In order to illustrate the invention several examples are given without however limiting the invention to them.

*Example 1*

0,5 gram of the dihydrofollicle hormone are dissolved in an excess of sodium hydroxide. The solution is stirred vigorously and twice the calculated quantity of benzoyl chloride is gradually added thereto in very small amounts. With proceeding benzoylation the monobenzoyl dihydrofollicle hormone of the formula $C_{25}H_{28}O_3$ precipitates. After filtration, it is purified by recrystallization whereby it is obtained in white, shining crystals of the melting point 187,5–190° C. The pure product is readily soluble in sesame oil and alcohol and exhibits in concentrated sulfuric acid a bluish-green fluorescence.

*Example 2*

0,5 gram of the dihydrofollicle hormone are dissolved in 20 grams of pure pyridine. Five times the calculated amount of benzoyl chloride is added to the solution. After allowing it to stand at room temperature for a longer period of time, the reaction mixture is poured in dilute hydrochloric acid, the precipitate is filtered off and recrystallized from dilute alcohol, whereby the pure dibenzoyl dihydrofollicle hormone is obtained. The pure product crystallizes in needles and has a melting point of 169–170° C.

*Example 3*

0,5 gram of dihydrofollicle hormone are dissolved in 10 cc. of acetic acid anhydride to which solution 1 gram of anhydrous sodium acetate is added. The reaction mixture is heated under reflux to the boiling point and kept at that temperature for 2 hours. Thereafter it is poured in water, the precipitated reaction product is recrystallized from dilute acetic acid. The pure product forms white crystals.

When using the monobenzoyl dihydrofollicle hormone obtained according to Example 1, as starting material, a crystalline benzoyl acetyl dihydrofollicle hormone is obtained.

*Example 4*

1 gram of benzoyl follicle hormone is dissolved in an autoclave in alcohol; 1 gram of a nickel-chromium catalyst, produced according to Couner, Folkers, and Adkins, J. Am. Chem. Soc. 54, 1138 (1932), is added to this alcoholic solution and hydrogen is introduced into the solution at a temperature of about 120°. The reduction is completed when no more hydrogen is absorbed by the solution, the latter is decanted or filtered and concentrated by evaporation. A crystalline reaction product is obtained which represents the monobenzoyl dihydrofollicle hormone of the formula $C_{25}H_{28}O_3$, and has a melting point of 189.5°. The physiological efficiency of the monobenzoyl derivative amounts to 15 million mouse units per gram when injecting its solution in oil.

*Example 5*

1 gram of follicle hormone of the melting point 253° is dissolved in acetic acid anhydride and 1 gram of anhydrous sodium acetate is added. The reaction mixture is reduced by adding 3 grams of zinc dust thereby maintaining the temperature at the boiling point. After the reaction is completed, the entire reaction mixture is poured in water whereby the excess of acetic acid anhydride is destroyed. A resinous product is precipitated which is purified by recrystallization from dilute alcohol, thereby yielding the diacetyl dihydrofollicle hormone.

When an unsaturated follicle hormone is used as the starting material, the final acylated product will contain one or more double bonds in a nucleus other than the benzene ring. At least one pair of hydrogen atoms on adjacent carbon atoms in such nucleus is replaced by a double bond so as to form a

configuration therein.

Of course, the given examples serve merely to illustrate the invention; various other modifications and changes in the processes and reagents may be made by those skilled in the art in accordance with the principles set forth herein and in the claims annexed hereto.

What we claim, is:—

1. A method of producing acyl derivatives of the dihydrofollicle hormone which consists in subjecting the follicle hormone to an acylating and a reducing treatment, the latter causing the reduction of the keto group of the follicle hormone to the secondary alcohol group.

2. A method of producing acyl derivatives of the dihydrofollicle hormone which consists in first acylating the follicle hormone and then subjecting the acylation product obtained thereby to a reducing treatment, the latter causing the reduction of the keto group of the follicle hormone to the secondary alcohol group.

3. A method of producing acyl derivatives of the dihydrofollicle hormone which consists in first reducing the follicle hormone whereby the keto group of the latter is transformed into the secondary alcohol group, and then subjecting the dihydrofollicle hormone to an acylating treatment.

4. A method of producing acyl derivatives of the dihydrofollicle hormone which consists in subjecting the dihydrofollicle hormone to the action of an acylating agent and isolating the reaction product.

5. A method of producing acyl derivatives of the dihydrofollicle hormone which consists in subjecting the monoacyl dihydrofollicle hormone to the action of an acylating agent and isolating the reaction product.

6. A method of producing acyl derivatives of the dihydrofollicle hormone which consists in subjecting the acylated follicle hormone to a reducing treatment, the latter causing the reduction of the keto group of the follicle hormone to the secondary alcohol group, and isolating the reaction product.

7. A method of producing acyl derivatives of the dihydrofollicle hormone which consists in subjecting the follicle hormone simultaneously to an acylating and a reducing treatment, the latter causing the reduction of the keto group of the follicle hormone to the secondary alcohol group, and isolating the reaction product.

8. A method of producing monoacyl derivatives of the dihydrofollicle hormone which consists in subjecting the dihydrofollicle hormone to the action of an acylating agent in the presence of a solvent which is non-reactive in the mixture and wherein the monoacyl compound is insoluble, and separating the precipitated monoacyl compound from the reaction mixture.

9. A method of producing monoacyl derivatives of the dihydrofollicle hormone which consists in subjecting the dihydrofollicle hormone to the action of an acylating agent in the presence of a solvent which is non-reactive in the mixture and wherein the monoacyl compound is insoluble, and separating the precipitated monoacyl compound from the reaction mixture and purifying the same.

10. A method of producing diacyl derivatives of the dihydrofollicle hormone which consists in subjecting the dihydrofollicle hormone to the action of an excess of an acylating agent in the presence of a solvent which is non-reactive in the mixture and wherein the mono- as well as the diacyl compound are soluble, and separating the diacyl compound from the reaction mixture.

11. A method of producing diacyl derivatives of the dihydrofollicle hormone which consists in subjecting the dihydrofollicle hormone to the action of an excess of an acylating agent in the presence of a solvent which is non-reactive in the mixture and wherein the mono- as well as the diacyl compound are soluble, precipitating the diacyl compound by diluting the reaction mixture with water and separating the precipitate from the liquid.

12. A method of producing diacyl derivatives of the dihydrofollicle hormone which consists in subjecting the dihydrofollicle hormone to the action of an excess of an acylating agent in the presence of a solvent which is non-reactive in the mixture and wherein the mono- as well as the diacyl compound are soluble, precipitating the diacyl compound by diluting the reaction mixture with water, separating the precipitate from the liquid and purifying the precipitated diacyl compound.

13. Acyl derivatives of the dihydrofollicle hormone of the formula

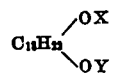

wherein the group OX is attached to the aromatic nucleus of the dihydrofollicle hormone and X represents an acyl group, while OY is a secondary alcohol group and Y represents either hydrogen or an acyl group.

14. Monobenzoyl dihydrofollicle hormone of the formula $C_{25}H_{28}O_3$, having a melting point of 187.5–190° C. and being soluble in alcohol and sesame oil, the solution in concentrated sulfuric acid showing a bluish-green fluorescence.

15. Dibenzoyl dihydrofollicle hormone of the formula $C_{32}H_{32}O_4$, having a melting point of 169–170° C. and being soluble in methanol and ether.

16. A follicle hormone compound having the following structural formula:

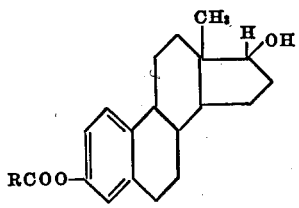

wherein R is alkyl or aryl.

17. A follicle hormone compound according to claim 16 in which at least one pair of hydrogen atoms on adjacent carbon atoms in a nucleus other than the benzene ring is replaced by a double bond so as to form a

configuration therein.

18. A follicle hormone compound having the following structural formula:

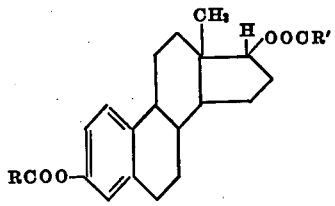

in which R and R' are alkyl or aryl groups.

19. A follicle hormone compound according to claim 18 in which at least one pair of hydrogen atoms on adjacent carbon atoms in a nucleus other than the benzene ring is replaced by a double bond so as to form a

configuration therein.

ERWIN SCHWENK.
FRIEDRICH HILDEBRANDT.